United States Patent [19]

Ichinokawa

[11] Patent Number: 5,926,330

[45] Date of Patent: Jul. 20, 1999

[54] OPTICAL VARIABLE POWER MODULE

[75] Inventor: Kazuhiro Ichinokawa, Tokyo, Japan

[73] Assignee: Asahi Kogaku Kogyo Kabushiki Kaisha, Tokyo, Japan

[21] Appl. No.: 08/943,287

[22] Filed: Oct. 3, 1997

[30] Foreign Application Priority Data

Oct. 4, 1996 [JP] Japan ..................................... 8-283376

[51] Int. Cl.⁶ ........................... G02B 7/182; G03G 15/04
[52] U.S. Cl. .......................... 359/872; 359/873; 399/196; 399/211; 399/212; 399/201
[58] Field of Search .................... 359/872, 873, 359/881, 221, 223, 198; 355/23, 18, 55, 60, 46; 399/196, 211, 212, 216, 218, 201

[56] References Cited

U.S. PATENT DOCUMENTS

| 4,126,389 | 11/1978 | Ikeda et al. ............................... 355/13 |
| 4,427,286 | 1/1984 | Bosse ...................................... 355/60 |
| 4,571,064 | 2/1986 | Hayashi et al. .......................... 399/201 |
| 5,835,824 | 11/1998 | Shinohara et al. ...................... 399/211 |

*Primary Examiner*—Cassandra Spyrou
*Assistant Examiner*—Mohammad Y. Sikder
*Attorney, Agent, or Firm*—Greenblum & Bernstein, P.L.C.

[57] ABSTRACT

An optical variable power module has a movable lens unit slidably mounted on a chassis, such that the lens unit is moved along an optical axis defined thereby, and a movable mirror unit slidably mounted on the chassis, such that the mirror unit is moved along the optical axis of the lens unit. The movable mirror unit has a frame, a pair of supporting plates shiftably attached to the frame, and at least one mirror supported by the supporting plates. The chassis has a pair of abutment faces formed thereon such that the supporting plates can be abutted against the abutment faces. The abutment faces define a plane perpendicular to the optical axis of the lens unit, whereby the supporting plates are shifted with respect to the frame such that the longitudinal axis of the mirror supported by the supporting plates is perpendicular to the optical axis of the lens unit.

12 Claims, 6 Drawing Sheets

(COPYING-MAGNIFICATION : 1.0)

OPTICAL VARIABLE POWER MODULE

BACKGROUND OF THE INVENTION

1. Field of the Invention

The present invention relates to an optical variable power module incorporated in an optical apparatus, such as an electrophotographic copier, and, more particularly, to an optical variable power module comprising a detachable chassis attached to a frame of the copier, and movable optical units slidably mounted on the chassis.

2. Description of the Related Art

An optical variable power system includes movable optical units (e.g. a movable lens unit, a movable mirror unit and so on) for varying a magnification of a focussing lens system included therein. The movable optical units must be assembled in a precise manner, which necessitates troublesome minute adjustments of the movable optical units. Accordingly, the optical variable power system is preassembled as a module, which is then incorporated in an optical apparatus, such as an electrophotographic copier. The assembly of the movable optical units and the troublesome adjustment thereof can only be carried out externally, as the internal space of the optical apparatus is extremely restricted.

Further, it is troublesome to properly assemble, for example, the movable mirror unit, having a relative complex structure, on the chassis in such a manner that a longitudinal axis of the movable mirror unit is precisely extended perpendicularly to an optical axis of the movable lens unit.

SUMMARY OF THE INVENTION

Therefore, an object of the present invention is to provide an optical variable power module incorporated in an optical apparatus, such as an electrophotographic copier, in which a movable mirror unit can be easily assembled on a chassis such that a longitudinal axis of the movable mirror unit is precisely extended perpendicularly to an optical axis of a movable lens unit.

In accordance with the present invention, there is provided an optical variable power module comprising: a chassis member; a movable lens unit slidably mounted on the chassis such that the movable lens unit is moved along an optical axis defined thereby; and a movable mirror unit slidably mounted on the chassis such that the movable mirror unit is moved along the optical axis of the movable lens unit, the movable mirror unit including a frame member, a pair of supporting plate members shiftably attached to the frame member, and at least one mirror member supported by the supporting plate members. The chassis has a pair of abutment faces which are formed thereon such that the supporting plate members can be abutted against the abutment faces. The abutment faces define a plane perpendicular to the optical axis of the movable lens unit, whereby the supporting plate members are shifted with respect to the frame member such that the longitudinal axis of the mirror member, supported by the supporting plate members, becomes perpendicular to the optical axis of the movable lens unit.

The movable mirror unit may further include a releasable fastener for tightening the supporting plate members to the frame member. In this case, preferably, the fastener comprises a screw threaded through an oval slot formed in each of the supporting plate members before being engaged with the frame member.

Each of the supporting plate members may have an elongated slot formed therein for receiving an end portion of the mirror member. Each elongated slot has a pair of positioning projections protruding from a side edge defining the elongated slot, such that a reflective surface of the mirror member is resiliently pressed against the positioning projections, resulting in ensuring that the mirror member can be properly positioned with respect to the supporting plate members. In this case, preferably, each of the supporting plate members has a rear edge for abutting against the corresponding abutment face, and the positioning projections thereof are formed by using the rear edge as a base line.

Preferably, the abutment faces of the chassis are disposed beyond a movement area in which the movable mirror unit is moved during an operation of the module.

BRIEF DESCRIPTION OF THE DRAWINGS

The object and other objects of the present invention will be better understood from the following description, with reference to the accompanying drawings in which.

DESCRIPTION OF THE PREFERRED EMBODIMENTS

Figure 1:
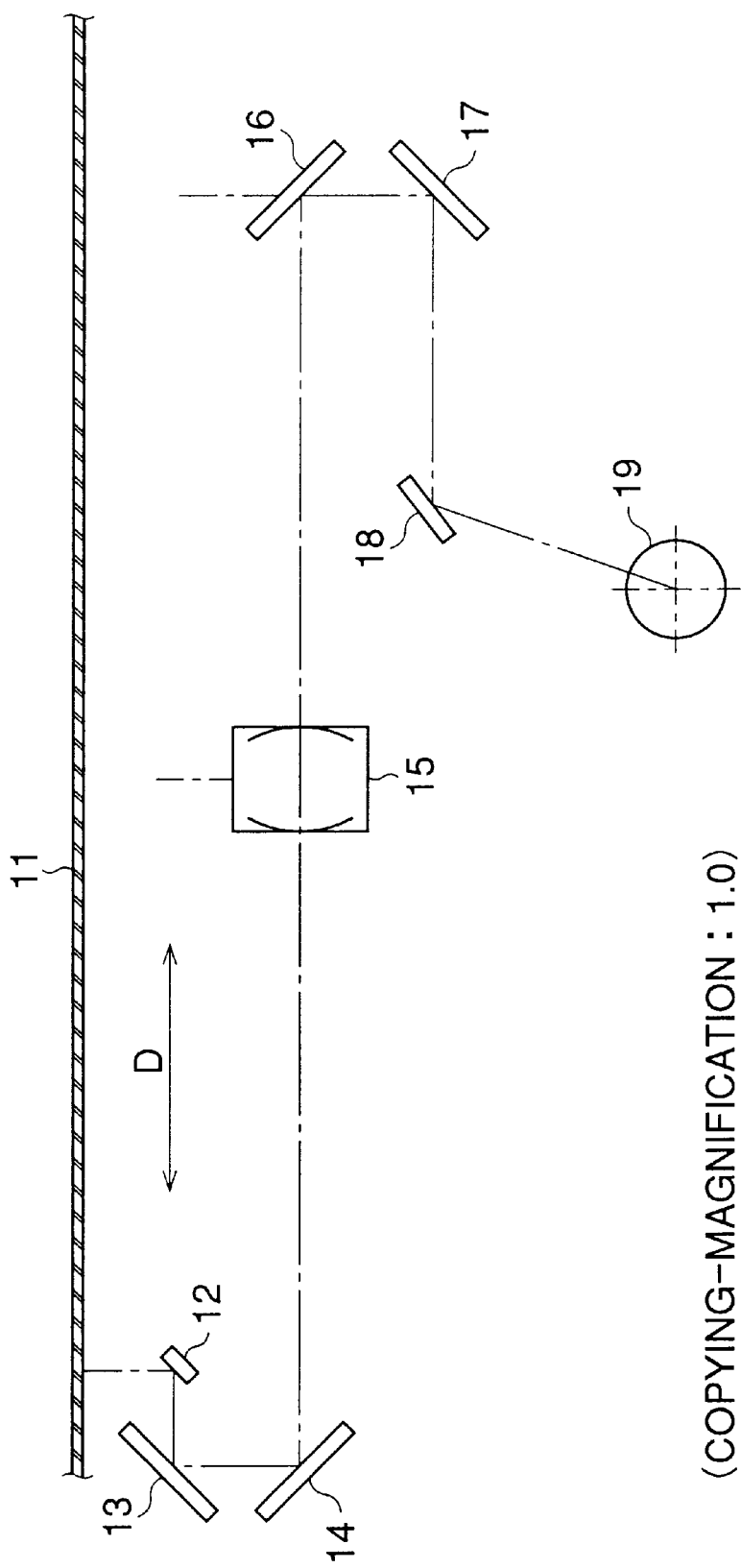
FIG. 1 is a schematic view showing an arrangement of the main optical elements of an electrophotographic copier in which an optical variable power module according to the present invention is incorporated.
Figure 2:
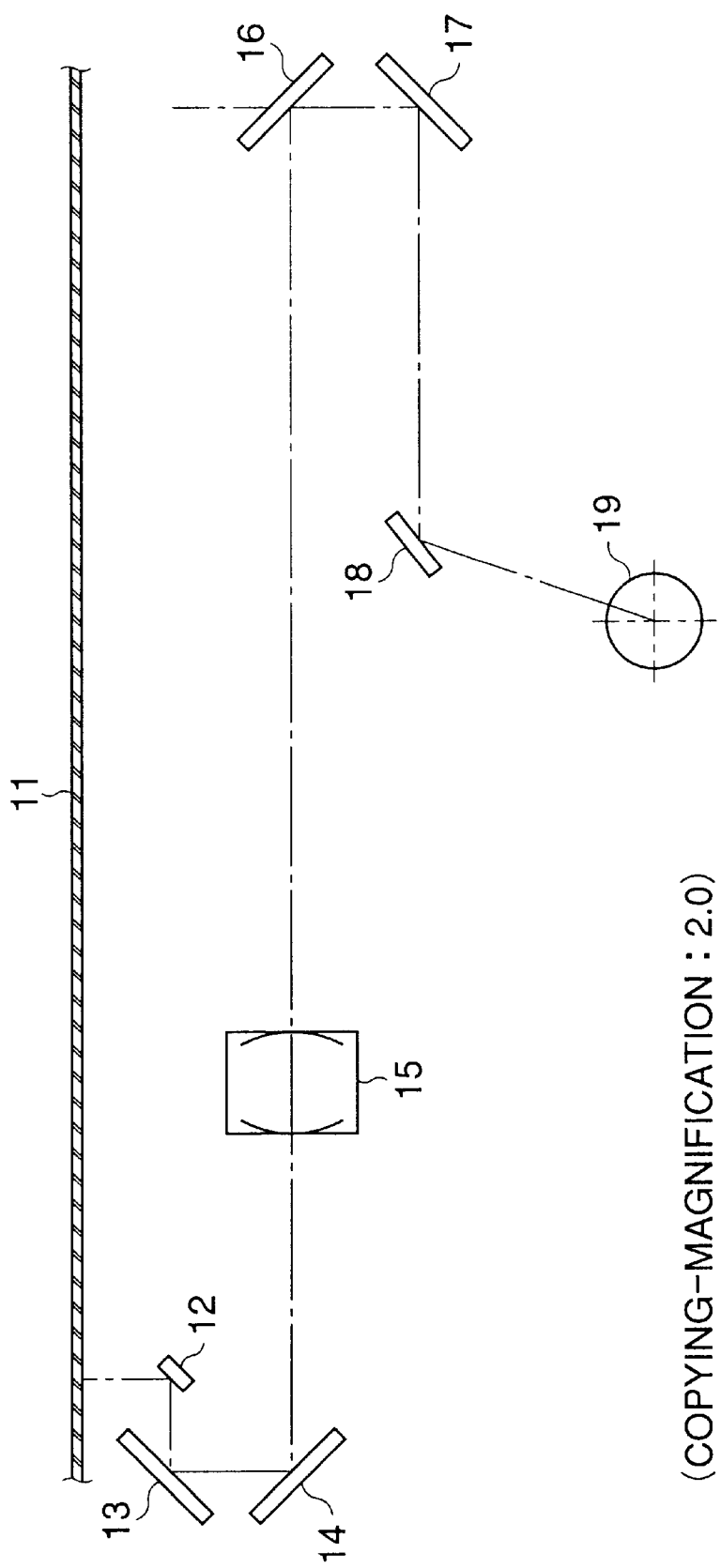
FIG. 2 is a schematic view similar to FIG. 1, but a movable lens unit and a movable mirror unit are shown at locations different from the locations shown in FIG. 1.

With reference to FIGS. 1 and 2, an arrangement of the main optical elements of an electrophotographic copier is schematically shown. The electrophotographic copier comprises a transparent glass plate 11 defining a copying-surface, on which an object to be copied is placed. During a copying operation, the glass plate 11 is illuminated by a suitable light source (not shown). Light rays, reflected from the object, are directed to a focussing lens 15 via a first mirror 12, a second mirror 13 and a third mirror 14, and are then focussed, via the focussing lens 15, a fourth mirror 16, a fifth mirror 17 and a sixth mirror 18, onto a surface of a photosensitive drum 19, whereby an image of the object is formed on the surface of the photosensitive drum 19.

The focussing lens 15, and the fourth, fifth and sixth mirrors (16, 17 and 18, respectively) form a part of an optical variable power module according to the present invention. The focussing lens 15 is movable along either one of the directions indicated by the double-arrowheads of an arrow D shown in FIG. 1. The fourth and fifth mirrors 16 and 17 form a movable mirror unit, which is also moved along either one of the directions indicated by the arrow D.

A copying-magnification of the image of the object, formed onto the photosensitive drum 19, can be varied by suitably and independently moving the focussing lens 15 and the movable mirror unit (16, 17) in either one of the directions of arrow D. In the arrangement of the focussing lens 15 and the movable mirror unit (16, 17) as shown in FIG. 1, the copying-magnification is 1.0, and, in the arrangement of the focussing lens 15 and the movable mirror (16, 17) as shown in FIG. 2, the copying-magnification is 2.0.

The first mirror 12 serves as a scanning mirror, and is movable in either one of the directions indicated by the arrow D. During the copying operation, the scanning mirror 12 is moved in only one of the directions of the arrow D, whereby the illuminated object is scanned with the scanning mirror 12. Similar to the fourth and fifth mirrors 16 and 17, both the second and third mirrors 13 and 14 form a movable mirror unit, which is movably supported in a suitable manner by a frame of the electrophotographic copier. While the illuminated object is scanned with the scanning mirror 12, the movable mirror unit (13, 14) is moved in the same direction as the scanning mirror 12, but a movement velocity of the first mirror unit (13, 14) is one-half of a movement velocity of the scanning mirror 12.

Note, of course, the mirrors 12, 13, 14, 16, 17 and 18 are of suitable length to completely cover and extend over a width of the object placed on the glass plate 11.

With reference to FIGS. 3 to 6, a construction of an optical variable power unit according to the present invention is shown, which comprises a rectangular chassis 21 made of a suitable metal material. The chassis 21 may be shaped by pressing. The optical variable power unit also comprises a movable lens unit 22 slidably mounted on the chassis 21. The movable lens unit 22 includes an elongated box-like frame, and the focussing lens 15 is securely mounted in the box-like frame 22a in such a manner that an optical axis of the focussing lens 15 is perpendicular to a longitudinal axis of the box-like frame 22a.

Figure 3:
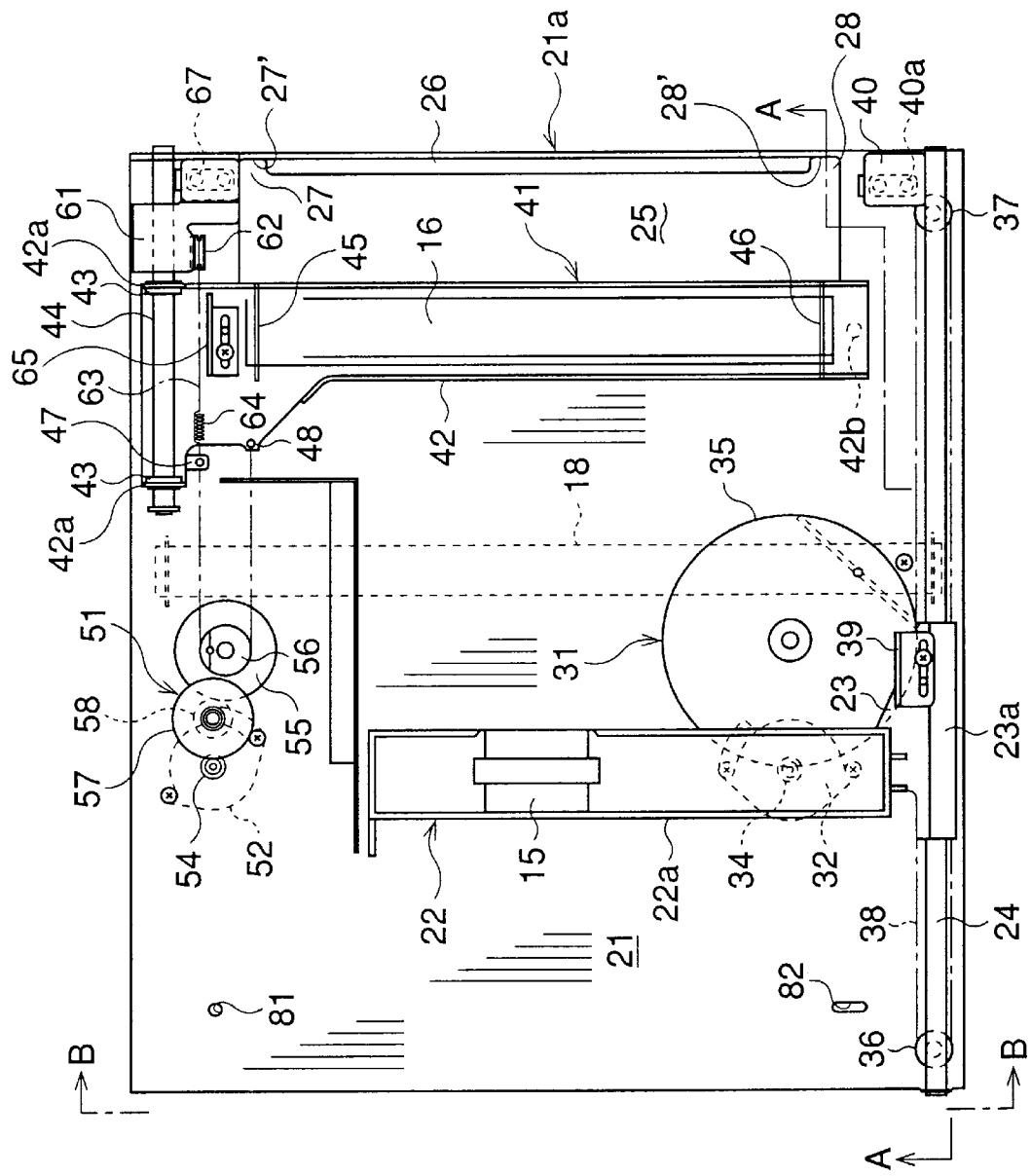
FIG. 3 is a plane view showing an embodiment of the optical variable power module according to the present invention.

The box-like frame 22a has a bracket 23 securely attached to and extending from one end thereof, and the bracket 23 has a sleeve 23a integrally formed therewith. The sleeve 23a is slidably passed over a first guide rod 24, which is arranged in parallel with the optical axis of the focussing lens 15 and along a side of the rectangular chassis 21, as shown in FIG. 3. Preferably, the sleeve 23a is formed of a suitable metal material, and has an inner low-frictional coat, such as polyacetal, formed over an inner surface thereof.

Figure 5:
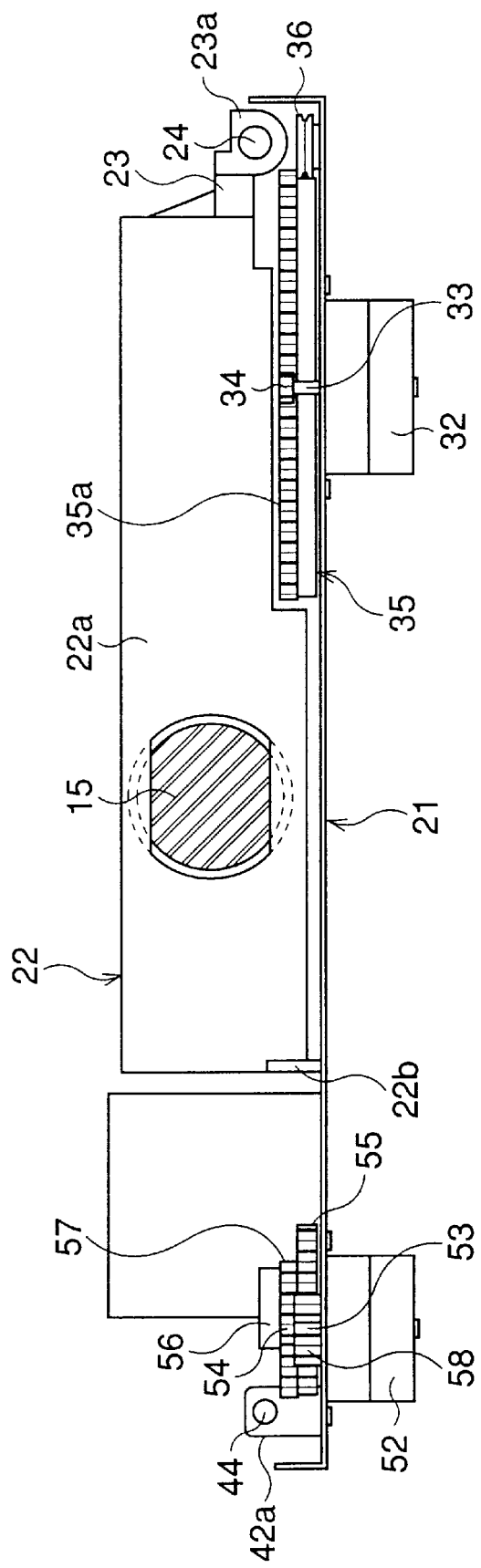
FIG. 5 is an end view observed from line B—B of FIG. 3.

The box-like frame 22a also has a slide shoe element 22b attached to the other end thereof, as shown in FIG. 5, and the slide shoe element 22b may be formed of a suitable low-frictional material such as polyacetal. Namely, the slide shoe element 22b bears the other end of the box-like frame 22a in such a manner that the movable lens unit 22 can be slidably moved along the first guide rod 24.

Figure 4:
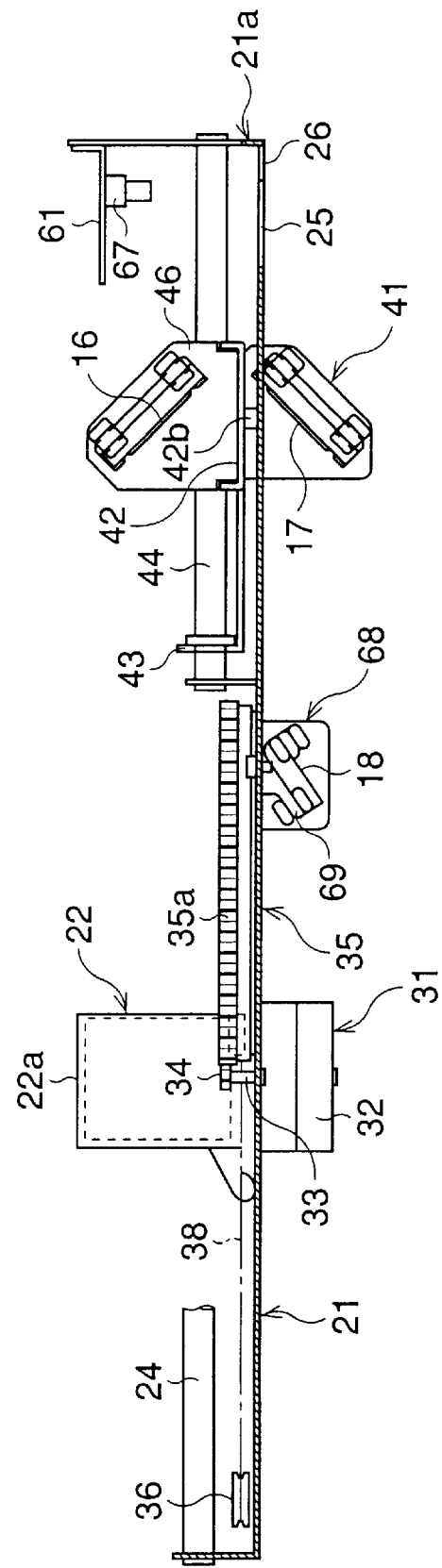
FIG. 4 is a sectional view taken along line A—A of FIG. 3.

The movement of the movable lens unit 22 is produced by a drive mechanism generally indicated by reference numeral 31. In particular, the drive mechanism 31 comprises a drive motor 32, such as a pulse motor, securely attached to a lower surface of the chassis 21. An output shaft 33 (FIGS. 4 and 5) of the drive motor 32 extends and through the chassis 21, and has a gear 34 securely mounted thereon. The drive mechanism 31 comprises a toothed pulley 35 having outer teeth 35a formed around an upper half area of the periphery thereof, and the toothed pulley 35 is rotatably provided on an upper surface of the chassis 21. The outer teeth 35a of the toothed pulley 35 are meshed with the gear 34 of the drive motor 32, as best shown in FIG. 4. Note, as is apparent from FIGS. 4 and 5, a lower half area of the periphery of the toothed pulley 35 is smooth.

Further, the drive mechanism 31 comprises a pair of idle pulleys 36 and 37 rotatably provided on the upper surface of the chassis 21 and disposed in the vicinity of the ends of the first guide rod 24. A drive wire 38 is entrained by the peripheral smooth area of the toothed pulley 35 and by the idle pulleys 36 and 37, and is suitably connected to the bracket 23 of the box-like frame 22a.

With the arrangement as mentioned above, the movable lens unit 22 can be moved along the first guide rod 24, i.e. the optical axis of the focussing lens 15, by driving the drive motor 32. Of course, a direction of the movement of the movable lens unit 22 is dependent upon a rotational drive direction of the drive motor 32.

As shown in FIG. 3, a detection lug 39, provided on the bracket 23 of the box-like frame 22a, acts in conjunction with a photo-interrupter type sensor 40a, provided on a rear surface of a bracket 40. The bracket 40 is provided at the corner of the chassis 21 which is in the vicinity of the idle pulley 27, but is spaced away from the upper surface of the chassis 21. A home position or origin position of the movable lens unit 22 is defined by a position of the photo-interrupter type sensor 40a. Namely, when the movable lens unit 22 is moved to the home position, the drive motor 32 is stopped at the time when the photo-interrupter type sensor 40a detects the detection lug 39, thereby ensuring the halting of the movable lens unit 22 at the home position.

Figure 6:
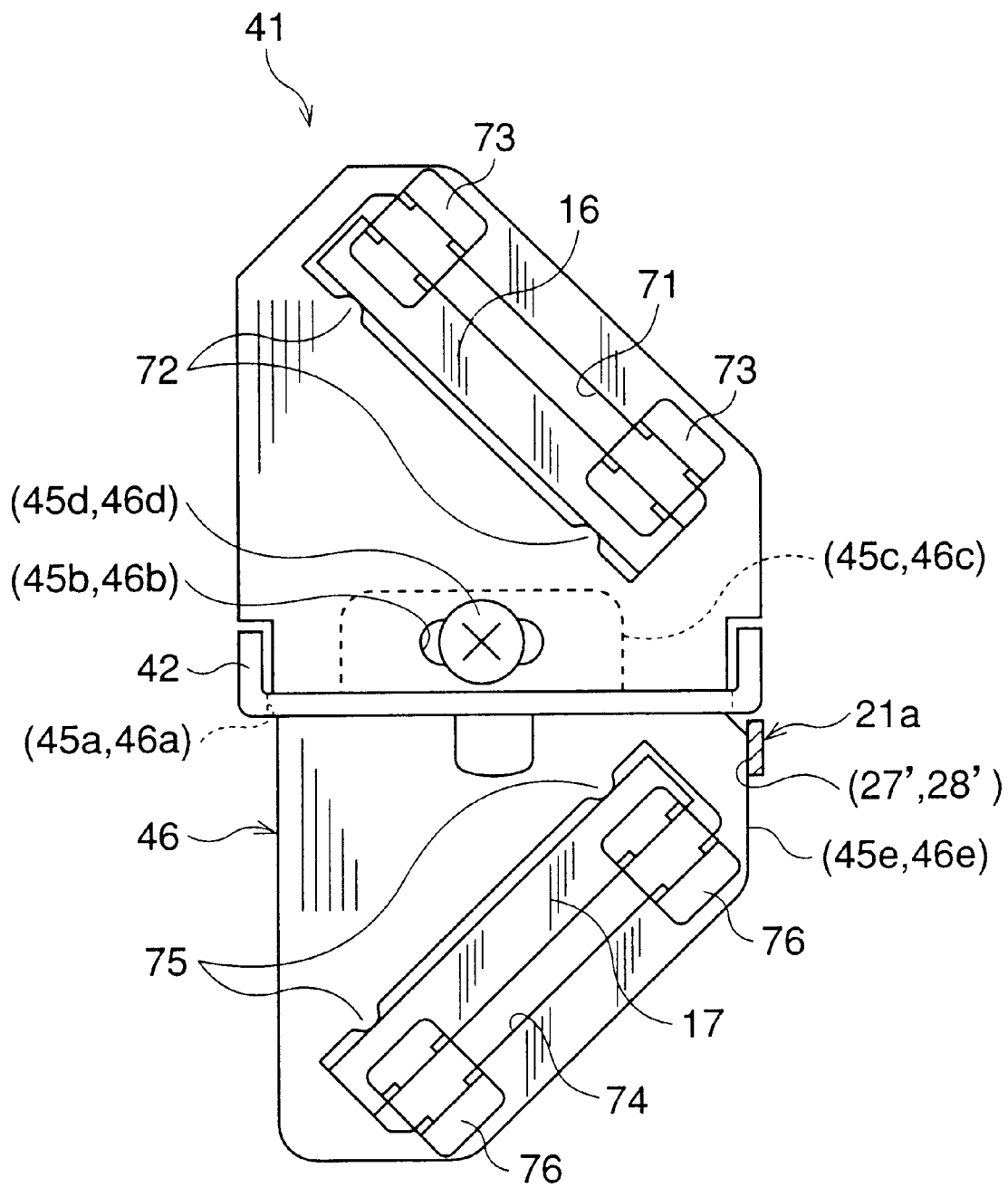
FIG. 6 is an enlarged end view of the movable mirror unit shown in FIG. 4.

As is apparent from the foregoing, the optical variable power module, according to the present invention, comprises the movable mirror unit formed by the fourth and fifth mirrors 16 and 17 (FIGS. 1 and 2). In FIGS. 3, 4 and 6, the movable mirror unit concerned is indicated by reference numeral 41. The movable mirror unit 41 is slidably arranged on the upper surface of the chassis 21, and includes a plate-like frame 42 extending in parallel with the box-like frame 22a of the movable lens unit 22, and a pair of vertical supporting plates 45 and 46 incorporated in the plate-like frame 42.

The vertical supporting plates 45 and 46 are identical to each other, and are inserted into slits 45a and 46a laterally formed in the plate-like frame 42 in the vicinity of the end portions thereof, as shown in FIG. 6. Each of the vertical supporting plates 45 and 46 has an oval slot 45b, 46b formed in a center area thereof, and the oval slot 45b, 46b is laterally extended with respect to the longitudinal axis of the plate-like frame 42. A flange element 45c, 46c is integrally formed along the corresponding slit 45a, 46a, and has a threaded hole formed therein. Each vertical supporting plate 45 and 46 is attached to the corresponding flange element 45c, 46c by engaging a screw 45d, 46d into the corresponding threaded hole.

As is apparent from FIG. 4, a lower portion of each vertical supporting plate 45, 46 extends downward through a generally-rectangular opening 25 (FIG. 3) formed in the chassis 21. The vertical supporting plates 45 and 46 are used to support the fourth and fifth mirrors 16 and 17.

In particular, as best shown in FIG. 6, an upper portion of each vertical supporting plate 45, 46 has an elongated slot 71 formed therein, and a longitudinal axis of the elongated slot 71 defines an angle of 45° with the lateral direction of the vertical supporting plates 45 and 46. Each end of the fourth mirror 16 is inserted into the corresponding slot 71 of the supporting plate 45, 46. The elongated slot 71 has a pair of positioning projections 72 protruded from a side edge defining the slot 71, and the mirror 16 is oriented in such a manner that the reflective surface thereof faces the positioning projections 72. Two wedge-shaped plate springs 73 are inserted into the space remaining at the rear side of the fourth mirror 16, so that the mirror 16 is resiliently pressed against the positioning projections 72, resulting in ensuring that the fourth mirror 16 can be properly positioned with respect to the vertical supporting plates 45 and 46.

Similarly, as shown in FIG. 6, the lower portion of each vertical supporting plate 45, 46 has an elongated slot 74 formed therein, and a longitudinal axis of the elongated slot 74 defines an angle of 45° with the lateral direction of the supporting plates 45 and 46 and an angle of 90° with the longitudinal axis of the elongated slot 71. Also, each end of the fifth mirror 17 is inserted into the corresponding slot 74 of the vertical supporting plate 45, 46. Further, the elongated slot 74 has a pair of positioning projections 75 protruded from a side edge defining the slot 74 in such a manner that the mirror 17 is oriented in such a manner that the reflective surface thereof faces the positioning projections 72, and two wedge-shaped plate springs 76 are inserted into the space remaining at the rear side of the fifth mirror 17, so that the mirror 17 is resiliently pressed against the positioning projections 72. Thus, the fifth mirror 17 can be also properly positioned with respect to the vertical supporting plates 45 and 46.

Although not visible, the plate-like frame 42 has an elongated opening formed therein, and the elongated opening is extended along the longitudinal axis of the plate-like frame 42. The light rays, reflected by the fourth mirror 16, are directed to the fifth mirror 17 through the elongated opening formed in the plate-like frame 42 and the opening 25 formed in the chassis 21.

An end portion of the plate-like frame 42 is extended in the width direction of the chassis 21, as shown in FIG. 3, and is integrally formed with a pair of ear elements 42a aligned with each other along the direction perpendicular to the longitudinal axis of the movable mirror unit 41. Each of the ear elements 42a has a through hole formed therein, and a slide ring element 43 is fitted around the circumference of the through hole of each ear element 42a. Note, the slide ring elements 43 may be formed of a sintered copper impregnated with a suitable lubricating oil.

The slide ring elements 43 of the ear elements 42a are slidably passed over a second guide rod 44, which is arranged in parallel with the optical axis of the focussing lens 15 and along the other side of the rectangular chassis 21 opposite to the side thereof along which the first guide rod 24 is arranged, as shown in FIG. 3.

The plate-like frame 42 also has a slide pad element 42b attached to the other end thereof, as best shown in FIG. 4, and the slide pad element 42b may be formed of a suitable low-frictional material such as polyacetal. Namely, the slide pad element 42b bears the other end of the plate-like frame 42 in such a manner that the movable mirror unit 41 is slidably moved along the second guide rod 44.

The movement of the movable mirror unit 41 is produced by a drive mechanism generally indicated by reference numeral 51. The drive mechanism 51 comprises a drive motor 52, such as a pulse motor, securely attached to the lower surface of the chassis 21. As best shown in FIG. 5, an output shaft 53 of the drive motor 52 is extended through the chassis 21, and has a gear 54 securely mounted thereon.

The drive mechanism 51 also comprises a double-gear member including a large gear portion 57 and a small gear portion 58 concentrically fixed to each other, and the double-gear member is rotatably provided on the upper surface of the chassis 21 in the vicinity of the gear 54. The large gear portion 57 of the double-gear member is meshed with the gear 54 of the drive motor 52.

Further, the drive mechanism 51 comprises a gear/pulley member including a gear 55 and a pulley 56 concentrically fixed to each other, and the gear/pulley member is rotatably provided on the upper surface of the chassis 21 in the vicinity of the double-gear. Note, as best shown in FIG. 3, the gear 55 has a diameter larger than that of the pulley 56. The gear 55 of the gear/pulley member is meshed with the small gear portion 58 of the double-gear member.

Yet further, the drive mechanism 51 comprises a guide pulley 62 rotatably attached to a bracket 61 such that a rotational axis of the pulley 62 is perpendicular to the longitudinal axis of the second guide rod 44. Note, the bracket 61 is spaced away from the upper surface so that the bracket 61 does not interfere with the movement of the movable mirror unit 41. A drive wire 63 is entrained by the pulley 56 of the gear/pulley member and the guide pulley 62, and the ends of the drive wire 63 are connected to the plate-like frame 42. In particular, one end of the drive wire 63 is connected to a tag element 47, protruding from the widely-extended end portion of the plate-like frame 42, through the intermediary of a coil spring 64. Then, the drive wire 63 is threaded around the guide pulley 62, and is wound several times around the pulley 56 of the gear/pulley member. Thus, the other end of the drive wire 63 is connected to the widely-extended end portion of the plate-like frame 42 at a location indicated by reference numeral 48.

With the arrangement as mentioned above, the movable mirror unit 41 can be moved along the second guide rod 44, i.e. the optical axis of the focussing lens 15, by driving the drive motor 52. Of course, a direction of the movement of the movable mirror unit 41 is dependent upon a rotational drive direction of the drive motor 52, and the opening 25 has a sufficient size to allow the movement of the movable mirror unit 41.

As shown in FIG. 3, a detection lug 65, provided on the widely-extended end portion of the plate-like frame 42, acts in conjunction with a photo-interrupter type sensor 67, which is provided on a rear surface of the bracket 61, to define a home position or origin position of the movable mirror unit 41. Namely, when the movable mirror unit 41 is moved to the home position, the detection lug 65 is detected by the photo interrupter type sensor 67, thereby halting the drive motor 52 and ensuring the stopping of the movable mirror unit 41, at the home position, at the time of the detection of the detection lug 65 by the photo-interrupter type sensor 67.

The optical variable power module, according to the present invention, further comprises a fixed mirror unit 68 securely attached to the lower surface of the chassis 21, and the fixed mirror unit 68 includes the above-mentioned sixth mirror 18. As best shown in FIG. 4, the fixed mirror unit 68 comprises an elongated frame 69 supported by the chassis 21, and the sixth mirror 18 is held by the elongated frame 69. The sixth mirror 18 is extended perpendicularly to the optical axis of the focussing lens 15 of the movable lens unit 22, and is inclined such that the light rays, received from the fifth mirror 17, are directed to the photosensitive drum 19 when the optical variable power module is incorporated in the electrophotographic copier (FIGS. 1 and 2).

In this embodiment, as shown in FIG. 3, the rectangular chassis 21 has a side wall 21a integrally formed along the side edge thereof which is close to the rectangular opening 25. The side wall 21a is extended perpendicularly to the optical axis of the focussing lens 15, and has a small height, as shown in FIGS. 4 and 6. A flange portion 26 is retained along the side wall 21a when the rectangular opening 25 is formed in the chassis 21, and a pair of notches 27 and 28 is formed in the flange portion 26, as shown in FIG. 3.

The notches 27 and 28 are spaced away from each other by a distance which is equal to the distance between the vertical supporting plates 45 and 46. The side wall 21*a* presents abutment faces 27' and 28' to the rear edge portions 45*e* and 46*e* of the vertical supporting plates 45 and 46, respectively, due to the formation of the notches 27 and 28 in the flange portion 26.

According to the present invention, during the assembly of the movable mirror unit 41 on the chassis 21, the screws 45*e* and 46*d* are not completely tightened. Namely, the screws 45*e* and 46*d* are initially tightened with a torque that allows the vertical supporting plates 45 and 46 to remain partly movable with respect to the plate-like frame 42. Then, the movable mirror unit 41 is manually shifted to the side wall 21*a* until the rear edges 45*e* and 46*e* of the vertical supporting plates 45 and 46 are abutted against the abutment faces 27' and 28', respectively. Note, when the optical variable power unit is operated in the electrophotographic copier, the vertical supporting plates 45 and 46 of the movable mirror unit 41 do not abut against the abutment faces 26' and 27'.

Thus, the vertical supporting plates 45 and 46 are minutely shifted, with respect to the plate-like frame 42, so that the rear edges 45*e* and 46*e* abut completely against the faces 27' and 28', whereby the vertical supporting plates 45 and 46 are properly and precisely positioned with respect to the plate-like frame 42, such that the longitudinal axes of the mirrors 16 and 17 extend perpendicularly to the optical axis of the focussing lens 15. Thereafter, the screws 45*e* and 46*d* are completely tightened such that the vertical supporting plates 45 and 46 are immovably attached to and held in the plate-like frame 42.

Note, the pair of positioning projections (72, 75) can be relatively easily and precisely formed by using the rear edge (45*e*, 46*e*) as a base line.

As shown in FIG. 3, the chassis 21 has a small round hole 81 and an oval hole 82 formed therein along the side of the chassis 21 opposite to the side wall 21*a*. These holes 81 and 82 are used to attach the optical variable module to the frame of the electrophotographic copier. Both the holes 81 and 82 are aligned with each other on a line perpendicular to the optical axis of the focussing lens 15 of the movable lens unit 22. Accordingly, the formation of the abutment faces 27' and 28' may be easily carried out by using the line between the holes 81 and 82 as a base line, such that a plane defined by the abutment faces 27' and 28' is in parallel with the line between the holes 81 and 82. Note, when the chassis 21 is shaped by pressing, the opening 25, the abutment faces 27' and 28' and the holes 81 and 82 are simultaneously shaped.

As is apparent from the foregoing, according to the present invention, it is possible to ensure proper and easy assembly of the movable mirror unit 41 on the chassis 21.

Finally, it will be understood by those skilled in the art that the foregoing description is of a preferred embodiment of the assembly, and that various changes and modifications may be made to the present invention without departing from the spirit and scope thereof.

The present disclosure relates to subject matter contained in Japanese Patent Application No. 8-283376 (filed on Oct. 4, 1996), which is expressly incorporated herein, by reference, in its entirety.

I claim:

1. An optical variable power module, comprising:

a chassis member;

a movable lens unit slidably mounted on said chassis member such that said movable lens unit is moved along an optical axis defined thereby; and a movable mirror unit slidably mounted on said chassis member such that said movable mirror unit is moved along aid optical axis of said movable lens unit, said movable mirror unit including a frame member, a pair of supporting plate members shiftably attached to said frame member, and at least one mirror member supported by said supporting plate members, wherein said chassis member has a pair of abutment faces formed thereon such that said supporting plate members can be abutted against said abutment faces, and which define a plane perpendicular to said optical axis of said movable lens unit, whereby said supporting plate members are shifted with respect to said frame member such that said mirror member supported by said supporting plate members is perpendicular to said optical axis of said movable lens unit.

2. An optical variable power module as set forth in claim 1, wherein said movable mirror unit further includes a releasable fastener for tightening said supporting plate members to said frame member.

3. An optical variable power module as set forth in claim 2, wherein said fastener comprises a screw, each of said supporting plate members having an oval slot formed therein for attaching a corresponding supporting plate member to said frame member by engaging said screw in said frame member through said oval slot.

4. An optical variable power module as set forth in claim 1, wherein each of said supporting plate members has an elongated slot formed therein for receiving an end of said mirror member, said elongated slot comprising a pair of positioning projections protruded from a side edge defining said elongated slot such that a reflective surface of said mirror member is resiliently pressed against said positioning projections, ensuring that said mirror member can be properly positioned with respect to said supporting plate members.

5. An optical variable power module as set forth in claim 4, wherein each of said supporting plate members has a rear edge which can abut against a corresponding abutment face, and said positioning projections thereof are formed by using said rear edge as a base line.

6. An optical variable power module as set forth in claim 1, wherein said abutment faces of said chassis are disposed beyond an area of movement in which said movable mirror unit is moved during an operation of said module.

7. An optical variable power module, comprising:

a chassis;

movable lens unit means slidably mounted on said chassis such that said movable lens unit means is moved along an optical axis defined thereby; and movable mirror unit means slidably mounted on said chassis such that said movable mirror unit means is moved along said optical axis of said movable lens unit means, said movable mirror unit means including frame means, a pair of supporting plate means shiftably attached to said frame means, and at least one mirror means supported by said supporting plate means, wherein said chassis has a pair of abutment faces formed thereon such that said supporting plate means can be abutted against said abutment faces, and which define a plane perpendicular to said optical axis of said movable lens unit means, whereby said supporting plate means are shifted with respect to said frame means such that said mirror means supported by said supporting plate means is perpendicular to said optical axis of said movable lens unit means.

8. An optical variable power module as set forth in claim 7, wherein said movable mirror unit means further includes releasable fastener means for tightening said supporting plate means to said frame means.

9. An optical variable power module as set forth in claim 8, wherein said fastener means comprises a screw, and each of said supporting plate means has an oval slot formed therein for attaching the corresponding supporting plate means to said frame means by engaging said screw in said frame means through said oval slot.

10. An optical variable power module as set forth in claim 7, wherein each of said supporting plate means has an elongated slot formed therein for receiving an end of said mirror means, said elongated slot comprising a pair of positioning projections protruded from a side edge defining said elongated slot such that a reflective surface of said mirror means is resiliently pressed against the positioning projections, ensuring that said mirror means can be properly positioned with respect to said supporting plates means.

11. An optical variable power module as set forth in claim 10, wherein each of said supporting plate means has a rear edge which can abut against a corresponding abutment face, and said positioning projections thereof are formed by using said rear edge as a base line.

12. An optical variable power module as set forth in claim 7, wherein said abutment faces of said chassis are disposed beyond an area of movement in which said movable mirror unit means is moved during an operation of said module.

* * * * *